Patented Mar. 25, 1952

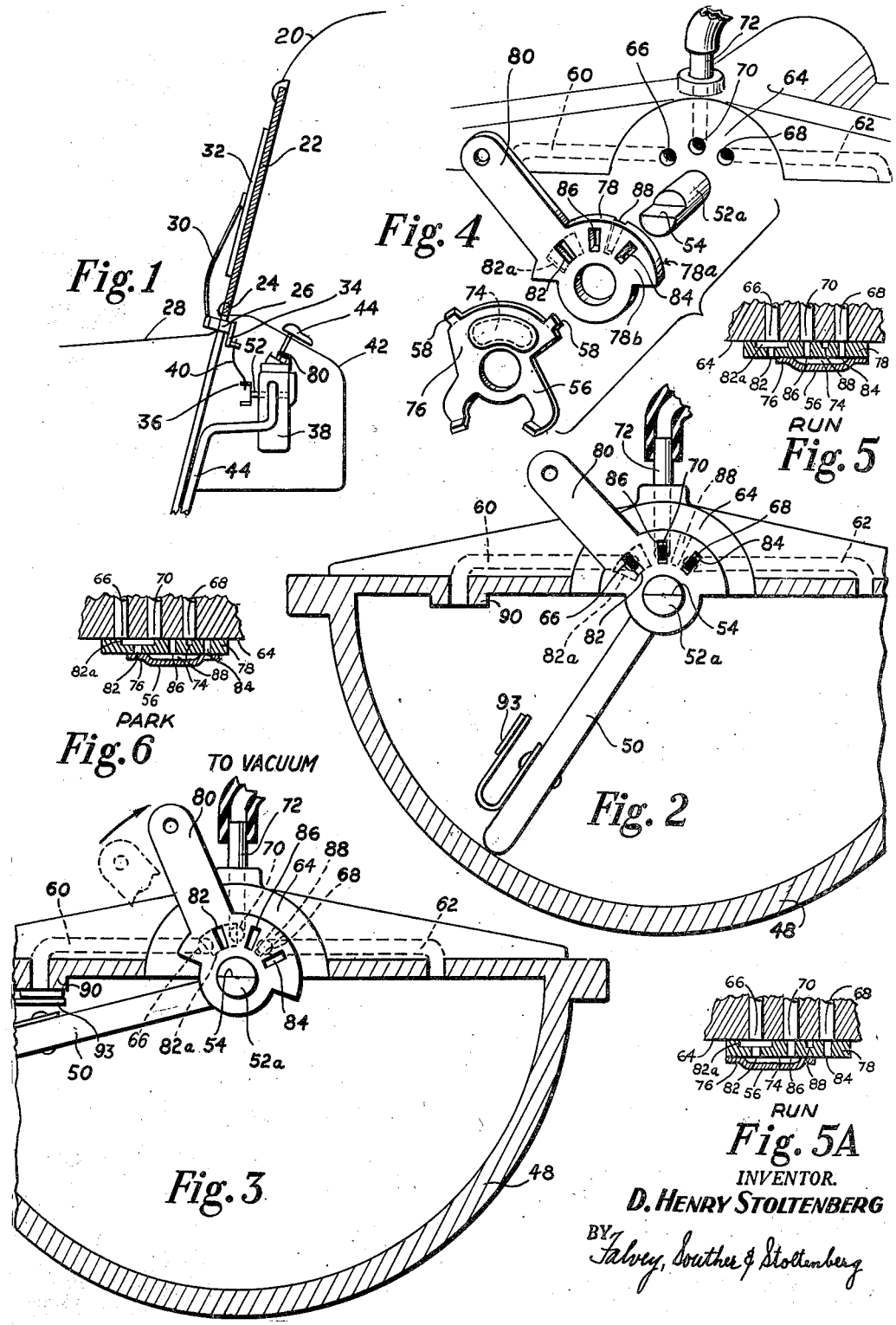

2,590,475

UNITED STATES PATENT OFFICE 2,590,475

PARKING VALVE FOR EXPANSIBLE CHAMBER WINDSHIELD WIPER MOTORS

Delbert Henry Stoltenberg, Toledo, Ohio, assignor to The Electric Auto-Lite Company, Toledo, Ohio, a corporation of Ohio Application November 13, 1944, Serial No. 563,264

6 Claims. (Cl. 121—97)

This invention relates to fluid-pressure operated windshield wiper motors, more particularly to parking means for such a motor to position the wiper blade near an edge of the windshield when the device is inoperative.

This invention contemplates the provision of a simplified parking means for a fluid-pressure operated windshield wiper motor which is applicable in principle to a manual control which is mounted on the motor itself for direct manual manipulation or may be modified for manipulation from a remote point by a simple linkage; furthermore, the principle can be incorporated in a remote control with a manually movable valve member at a remote place, with communication established between by a conduit having a multiplicity of passages such as disclosed and claimed in application Serial No. 566,068, filed December 1, 1944, issued as Patent No. 2,436,462. The invention allows simplification of castings from which the motor is fabricated, and obviates a complicated network of conduits in the casing.

It is, therefore, a principal object of this invention to improve and simplify the parking devices for fluid-pressure operated windshield wiper motors.

It is a further object of this invention to simplify the castings used in the fabrication of windshield wiper motors when provided with parking devices.

It is a further object of this invention to provide a parking principle for fluid-pressure operated motors which is applicable to motors having manual control devices on the motor itself or to motors having segregated manual valving devices capable of being manipulated at a remote place to control the operation of the motor and to park the same.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Fig. 1 is an elevational view of the invention as applied to an automobile.

Fig. 2 is an elevation, partly in section.

Fig. 3 is an elevation, partly in section, showing the motor relations in parking.

Fig. 4 is an exploded perspective view.

Figs. 5, 5A and 6 are plan views, in section, of the motor control and automatic valve means.

Referring now to the drawing, particularly to Fig. 1, an automobile body section 20 is shown having a windshield 22 having a lower edge 24, adjacent which a pivot 26 is mounted in the cowl member 28, having mounted thereon on its outer end a windshield wiper arm 30 for driving a blade 32 over the outer surface of the windshield in an arc as is well known in the art. The inner end of the pivot 26 is provided with an arm 34, or the like, which is connected to a driver arm 36 on the fluid-pressure operated motor 38 by a linkage 40. The motor 38 is mounted in any convenient manner (not shown) to the frame of the automobile and furnishes the power to move the blade 32 over the surface of the windshield and to park the same adjacent the lower edge 24. The motor is concealed under a dash 42 and is provided with a manual control 44 as will be described in greater detail hereinafter. A conduit 46 is provided to communicate with the fluid-pressure motor 38 and the intake manifold of the automobile motor (not shown) to utilize the suction therein for driving the windshield wiper motor.

The motor 38 may have a casing 48 of semi-circular contour, as shown in Figs. 2 and 3, having therein a movable vane or piston 50 oscillatable about a shaft 52 journaled in a bearing in the casing. These details of construction of the casing and piston are well known in the art and may be varied widely. The driver arm 36 is attached to one end of the shaft 52 (Fig. 1) which projects a substantial distance from the casing. On the other end 52a of the shaft a non-circular portion 54 is provided which drives an automatic valve control mechanism (not shown) which may be similar to any of the control mechanisms well known in the art, usually involving an overcenter device which snaps over from one position to another through a lost motion connection with shaft 52 after the shaft has been oscillated by the piston 50 through a predetermined angle. This automatic control mechanism moves a flop valve 56 by cooperating with nibs 58 through an angle around the shaft 52 on which the valve is pivoted sufficiently to reverse the application of a fluid-pressure differential to the two sides of the piston 50 in the chambers formed thereby in the casing 48. Conduits 60 and 62 lead from the respective chamber to a valve seat 64 which is pierced by ports 66 and 68 terminating the conduits 60 and 62 respectively. A third port 70 at a central location pierces the valve seat 64 between ports 66 and 68 and is placed in communication with a source of suction such as the intake manifold of an automotive engine (not shown) by means of conduit 72.

The ports 66, 68 and 70 are preferably uniformly spaced and concentrically arranged with reference to the shaft 52 so that a depression 74 formed in the valve member 56 will bridge ports 70 and 68, or ports 70 and 66, to control the vacuum applied to the chambers, when the valve member 56 is moved by the automatic valve control mechanism. The valve member 56 is provided with a laterally projecting flange 76 whose function will be described in further detail hereinafter. The flange 76 is however not sufficiently wide to cover port 66 when the depression 74 places port 70 in communication with port 68. Stop means (not shown) may be provided to limit the movement of the valve member 56 with reference to seat 64 to assure proper cooperation between ports 66 and 70 and ports 68 and 70 and the depression 74 of the valve member 56 for placing them in communication.

Between the valve seat 64 and the flop valve 56, a manually movable control valve 78 is positioned, comprising a flat plate with parallel surfaces, an inner surface 78a cooperating with the valve seat 64 and may be spring pressed thereagainst to form a tight connection, and an outer surface 78b against which the flop valve 56 moves under relatively light spring pressure. The control valve 78 may be pivoted on the shaft 52 for movement about the same axis as that of the flop valve 56 and its cooperating ports 66, 68 and 70. The control valve is provided with a projecting handle 80 for direct manual manipulation or for cooperation with a simple linkage with a remote control knob 44 as shown in Fig. 1.

The control valve is provided with three main ports 82, 84 and 86 which pierce the plate of which it is formed and are spaced to align with ports 66, 68 and 70 respectively when the control valve is in operative position, as shown in a plan in section in Fig. 5, with the depression 74 of the flop valve 56 which moves across the front face 78b of the control valve alternately establishing communication between ports 86 and 84 of the control valve and also 70 and 68 of the valve seat 64 in one position (Fig. 5) and ports 86 and 82 of the control valve and also 70 and 66 of the valve seat 64 in the other position (Fig. 5A). This will cause the motor to operate in a normal manner.

Port 82 of the control valve is enlarged at the rear face 78a to form a bridging conduit 82a of sufficient dimension to bridge ports 66 and 70 as will be described hereinafter. The bridging conduit may be symmetrically disposed with reference to port 82 by extending an equal distance on either side thereof with one side extending to approximately one-half the distance between ports 66 and 70. With the ports 82, 84 and 86 in alignment with ports 66, 68 and 70, a radial venting port 88 is provided on the rear face 78a of the control valve, as is most clearly shown in Figs. 2, 4 and 5, having no communication with the front face 78b but being open to the atmosphere at the edge of the plate of the control valve as is clearly shown in Fig. 4. The radial venting port is positioned midway between ports 70 and 68 as shown in Figs. 2, 5 and 5A. During normal operation of the motor this venting port will be inactive.

When an operator desires to terminate the normal operation of the motor and to park the wiper blade 32 adjacent the lower edge 24 of the windshield 22 (Fig. 1), he will move the control valve clockwise (Fig. 2) about the shaft 52 by the manual control 44 or by a linkage 80 cooperating therewith until the ports 82, 84 and 86 of the control valve are no longer in alignment with ports 66, 68 and 70 of the valve seat (in alignment as shown in Figs. 5 and 5A) to a position shown in Figs. 3 and 6, where the bridging conduit 82a is in communication with ports 66 and 70 in the valve seat and the radial venting port 88 is in communication with port 68. Ports 84 and 86 are completely out of alignment and are inactive, while port 82 in communication with bridging conduit 82a, is covered by flange 76 of the flop valve 56 and is, therefore, inactive. The suction active in port 70 will then flow along the bridging conduit from the port 66 which is in communication by conduit 60 with the parking side of the motor chamber, while the other side will be vented to the atmosphere by conduit 62 and the radial venting port 88 which places port 68 in communication with the atmosphere. This will move the piston to the left side of the chamber in parked position where the mouth 90 of conduit 60 will be closed by a piston valve 93 resiliently attached to the piston.

When the operator desires to again start the motor, he moves the control valve from its parking position counterclockwise to the position shown in Figs. 5 and 5A. The speed of operation of the motor may be controlled by the operator by "cracking" the alignment of the ports which will effect a throttling for the flow of fluid in the conduits 60 and 62.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation.

What is claimed:

1. In a windshield cleaner motor having a piston chamber, a piston operable therein, automatic valve means for operatively applying fluid pressure to the piston including a valve seat having a multiplicity of ports including at least two chamber ports and a suction supply port, a manually movable valve cooperating with said ports in said seat including a bridging conduit and a vent conduit open to atmosphere, a second set of ports in cooperative relation with the manually movable valve capable of being aligned with the ports on said valve seat when in operative position, one of said second set of ports communicating with the bridging conduit, an automatic flop valve member cooperating with the manually movable valve member to connect the suction supply port of both the valve seat and the manually movable valve alternately with each set of aligned chamber ports on the valve seat and the manually movable valve and to open the unconnected set of aligned chamber ports on the valve seat and the manually movable valve to the atmosphere, said manually movable valve movable to parking position to disalign the sets of ports on the manually movable valve and the valve seat and to move the bridging conduit into communication with the suction supply port on said seat and one of the chamber ports on said seat and to align the vent conduit with the other chamber port whereby suction is applied to one chamber port on the seat and the other chamber port on the seat is vented to the atmosphere to park the motor.

2. In a windshield cleaner motor having a piston chamber, a piston operable therein, automatic valve means for operatively applying fluid pressure to the piston including a valve seat having a multiplicity of ports including at least two chamber ports and a suction supply port, a manually movable valve cooperating with said seat having ports capable of being aligned with the ports in said seat, said valve including a bridging conduit in communication with one of said ports in said valve cooperating with one of said chamber ports in said seat and a venting conduit open to the atmosphere, an automatic flop valve member cooperating with the manually movable valve member to connect the suction supply port of both the valve seat and the manually movable valve alternately with each set of aligned chamber ports on said valve seat and manually movable valve and to open the unconnected set of aligned chamber ports on the valve seat and the manually movable valve to the atmosphere, said manually movable valve movable to parking position to disalign the sets of ports on the manually movable valve and the valve seat and to move the bridging conduit into communication with the suction supply port on said seat and one of the chamber ports on said seat and to align the vent conduit with the other chamber port whereby suction is applied to one chamber port on the seat and the other chamber port on the seat is vented to the atmosphere to park the motor.

3. In a windshield cleaner motor having a piston chamber, a piston operable therein, automatic valve means for operatively applying fluid pressure to the piston including an automatic flop valve member and a valve seat operating therewith having a multiplicity of ports including at least two chamber ports and a suction supply port, a manually movable control valve positioned between said flop valve member and said valve seat pierced by three ports capable of being aligned with said chamber ports and suction supply port on said valve seat, said control valve having on its side cooperating with the valve seat a bridging conduit in communication with one of said ports piercing the control valve and a venting conduit in communication with the atmosphere, said control valve when in running position enabling the automatic flop valve member to connect the suction supply port of the valve seat and the control valve alternately with each set of aligned ports on said valve seat and control valve and to open the unconnected set of aligned ports on the flop valve member and the control valve to the atmosphere said control valve movable to a parking position to disalign the set of ports on the control valve and the valve seat and move the bridging conduit into communication with the suction supply port on the seat and one of the chamber ports of the seat and to align the vent conduit with the other chamber port whereby suction is applied to one chamber port and the other chamber port is vented to the atmosphere to park the motor.

4. In a windshield cleaner motor having a piston chamber, the piston operable therein, automatic valve means for operatively applying fluid pressure to the piston including an automatic flop valve member and a valve seat having at least two chamber ports and a suction supply port cooperating with the flop valve member, a plate-like control valve positioned between the automatic flop valve member and the valve seat pierced by ports capable of being aligned with said chamber and suction supply ports, said control valve having on its side in cooperative relation with the valve seat a bridging conduit in communication with one of the ports of the control valve and a venting conduit in communication with the atmosphere, flange means on the automatic flop valve member cooperating with the port of the control valve in communication with the bridging conduit, the automatic flop valve member when the control valve is in running position alternately connecting the aligned suction supply ports with the aligned chamber ports of the control valve and the valve seat, said control valve when moved to parking position disaligns the sets of ports of the control valve and the valve seat and moves the bridging conduit into communication with the suction supply port and one of the chamber ports on said seat and aligns the vent conduit with the other chamber port whereby suction is applied to one chamber port on the seat with the flange on the flop valve member closing the port in the control valve communicating with the bridging conduit and the other chamber port on the seat is vented to the atmosphere to park the motor.

5. In a fluid motor, first and second members movable relative to each other back and forth between normal limits under the influence of a reversibly applied differential between higher and lower fluid pressures, a supply passage adapted for connection to a source of one of said pressures, and valve mechanism for controlling said motor including reversing and control valves for providing running and parking connections between said motor and said passage and between said motor and a source of the other of said pressures, said parking connections between said motor and said source of the other of said pressures including said control valve independently of the position of said reversing valve, said reversing valve being automatically operable at said limits, said control valve being movable between a first position in which it establishes said running connections and in which said reversing valve is operable to reverse the connection between said passage and said motor and a second position in which it establishes said parking connections and in which said reversing valve is ineffective to so reverse said connection and including at least one passageway which forms a part of said running connections when said control valve is in said first position and which forms a part of said parking connections when said control valve is in said second position.

6. In a fluid motor, first and second members movable relative to each other back and forth between normal limits under the influence of a reversibly applied differential between higher and lower fluid pressures, a supply passage adapted for connection to a source of one of said pressures, and valve mechanism for controlling said motor including means defining spaced valve seats and reversing and control valve elements slidable along said seats for providing running and parking connections between said motor and said passage and between said motor and a source of the other of said pressures, said supply passage opening through at least one of said seats and communicating at all times with said reversing valve element, said parking connections between said motor and said source of the other of said pressures including said control valve independently of the position of said reversing valve, said reversing valve being automatically operable at said limits, said control valve being movable between a first position in which it establishes said running connections and in which said reversing valve is operable to reverse the connection between said passage and said motor and a second position in which it establishes said parking connections and in which said reversing valve is ineffective to so reverse said connection.

D. HENRY STOLTENBERG.

REFERENCES CITED

The following references are of record in the file of this patent:

UNITED STATES PATENTS

| Number | Name | Date |
|---|---|---|
| 1,738,311 | Oishei et al. | Dec. 3, 1929 |
| 1,840,233 | Hueber | Jan. 5, 1932 |
| 2,257,066 | O'Shei | Sept. 23, 1941 |

FOREIGN PATENTS

| Number | Country | Date |
|---|---|---|
| 697,976 | France | Nov. 5, 1930 |